W. L. SHELDON.
POWER STEERING MECHANISM.
APPLICATION FILED JUNE 24, 1918.

1,309,261.

Patented July 8, 1919.
2 SHEETS—SHEET 1.

Witness
L. S. Woodhull

Inventor
Walter L. Sheldon
By B. F. Wheeler
Attorney

W. L. SHELDON.
POWER STEERING MECHANISM.
APPLICATION FILED JUNE 24, 1918.

1,309,261.

Patented July 8, 1919.
2 SHEETS—SHEET 2.

Witness
L. L. Woodhull

Inventor
Walter L. Sheldon
By B. F. Wheeler
Attorney

UNITED STATES PATENT OFFICE.

WALTER L. SHELDON, OF DETROIT, MICHIGAN.

POWER STEERING MECHANISM.

1,309,261. Specification of Letters Patent. Patented July 8, 1919.

Application filed June 24, 1918. Serial No. 241,514.

*To all whom it may concern:*

Be it known that I, WALTER L. SHELDON, a citizen of the Dominion of Canada, residing at Detroit, in the county of Wayne and State of Michigan, have invented a new and useful Power Steering Mechanism, of which the following is a specification.

This invention relates to power steering mechanisms for motor vehicles.

Its object is primarily to relieve the operator of a motor vehicle from the physical exertion involved in controlling the course of a vehicle by the usual manually actuable steering mechanisms, so that a lack of strength will not prove a handicap to motor vehicle operators and more particularly to women.

A further object is to provide for automatically releasing the power steering mechanism from the engine when the steering wheels have been shifted in either direction to substantially their limiting angular relation to the course of the vehicle so as to safeguard the mechanism against breakage in case through carelessness on the part of a driver the power is not cut off therefrom at the proper time.

In attaining this object the invention contemplates providing a speed reduction gearing through which power from the engine may be applied to the steering bar to shift the steering wheels, the direction in which the latter are turned depending on which of two clutch connections are established, which connections are separately controllable from the driver's seat, said clutches further being automatically controlled by movement of the steering bar to prevent power being applied to said bar after the maximum permissible shifting of the wheels has been effected.

A preferred embodiment of the invention is disclosed in the accompanying drawings, wherein, Figure 1 is a view in side elevation of the front portion of a motor vehicle, to which the invention is applied.

Figure 1:
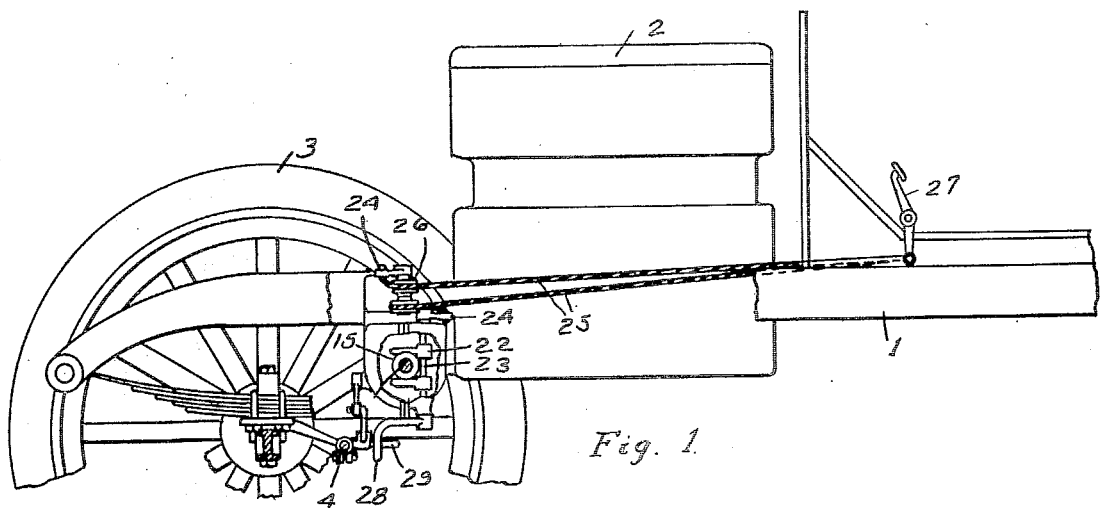
Figure 2:
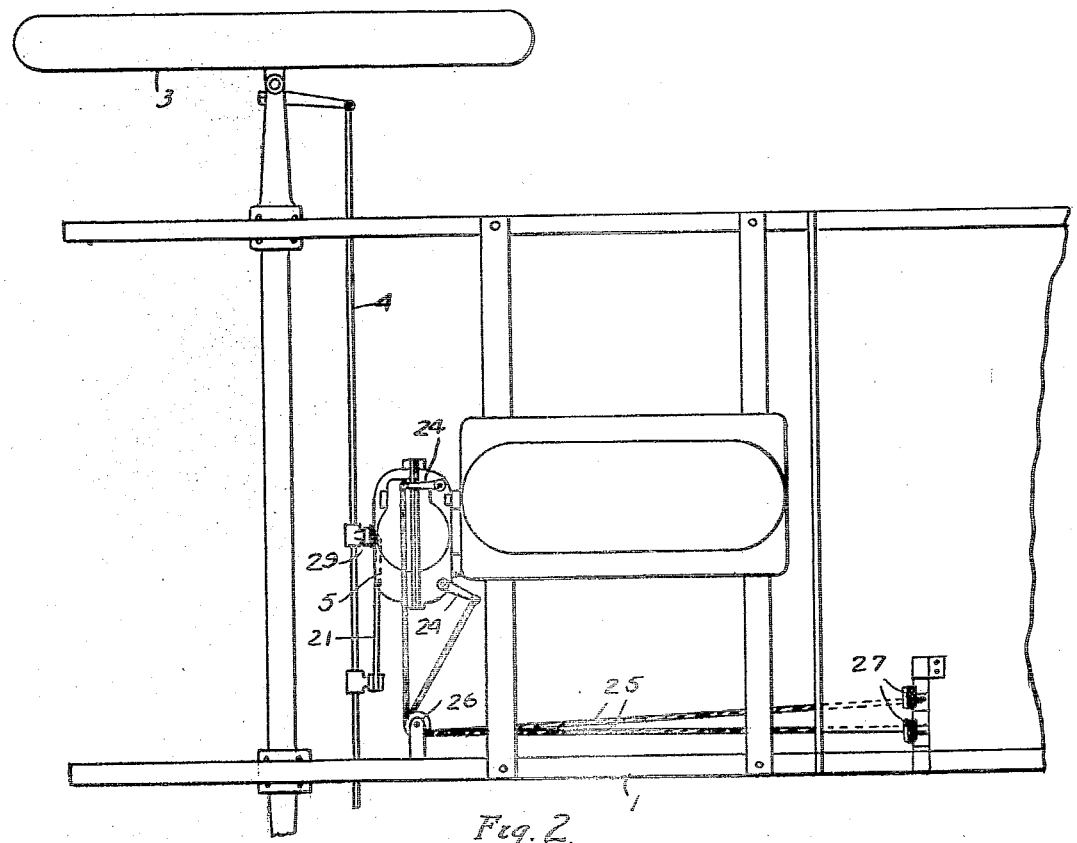
Fig. 2 is a top view of the same.
Figure 4:
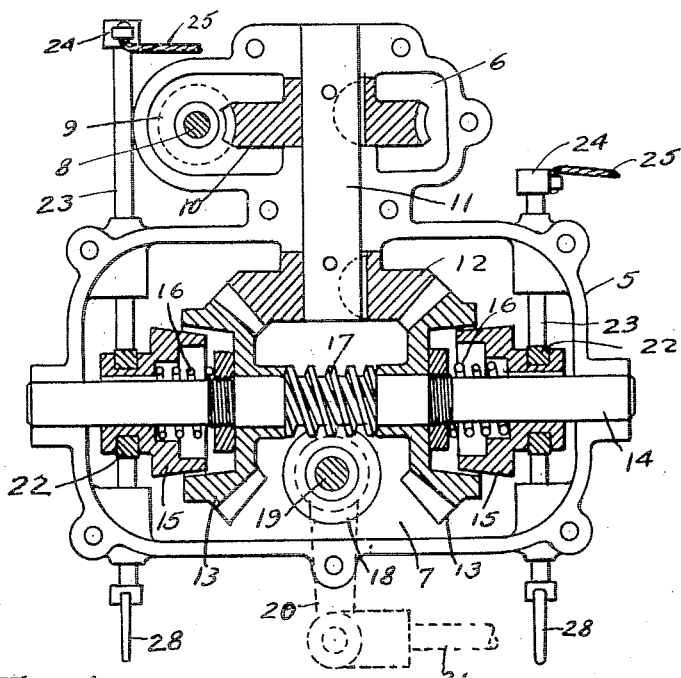
Fig. 4 is a vertical sectional view of the reduction gearing and clutch mechanism through which the wheels are actuable from the engine.
Figure 3:
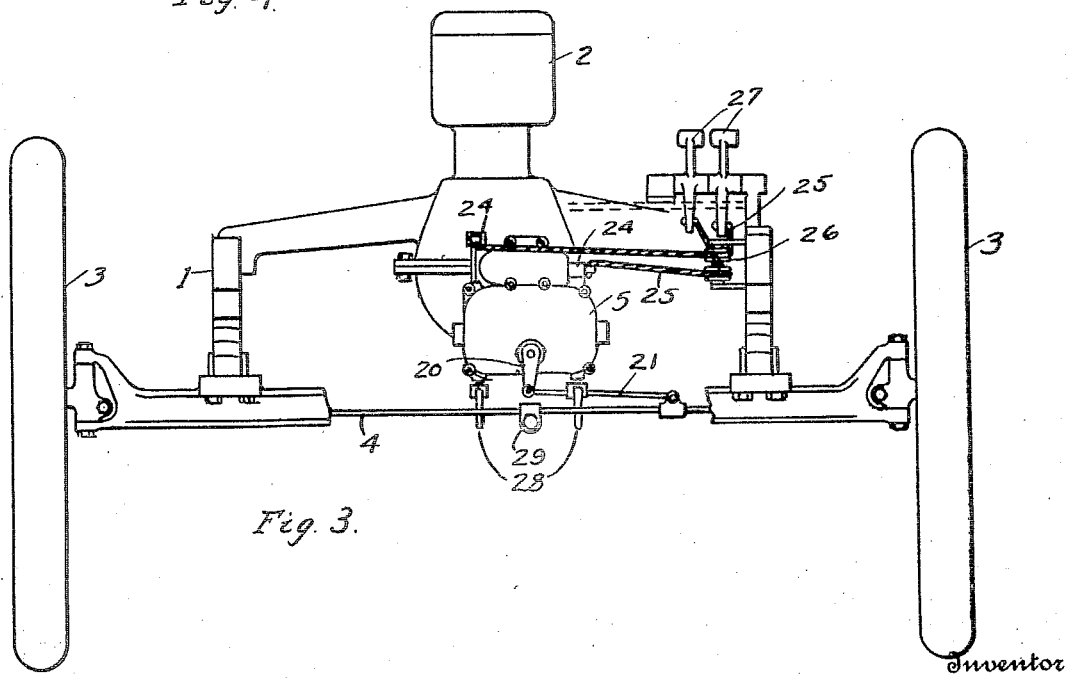
Fig. 3 is a front view of the same.

In these views the reference character 1 designates the frame, 2 the engine, 3 the front or steering wheels and 4 the steering bar of a motor vehicle, these parts being arranged in their usual well known relation. To the front end of the engine there is secured a casing 5 forming upper and lower gear chambers 6 and 7 respectively, the shaft of the engine being extended into the chamber 6 as indicated at 8 and carrying within said chamber a worm 9 engaging a wormwheel 10 fast upon a vertical shaft 11. Within the lower chamber 7 a bevel gear 12 is fast upon the shaft 11 and is enmeshed at diametrally opposed points with a pair of bevel gears 13 mounted loosely upon a horizontal shaft 14 extending transversely of the vehicle. Each of said gears is engageable by a friction clutch member 15, whereby it may be established in a driving relation with the shaft 14, said members being held normally disengaged from said gears by coiled springs 16. Between the gears 13 a worm 17 is mounted fast upon the shaft 14 and meshes with a worm wheel 18 upon a rock-shaft 19 parallel to the engine shaft. Exterior to the casing 5 a downwardly projecting arm 20 is carried by the shaft 19, the same terminating adjacent to the steering bar 4 and being adapted to actuate said bar (and the steering wheels) through a swinging rod 21.

For independently actuating the clutch members 15, each of the same is formed with an annularly grooved hub engageable by arms 22 projecting from a vertical rockshaft 23, the two rock-shafts 23 being journaled in the casing 5 and projecting above and below the same. Above the casing said rock-shafts carry arms 24, respectively projecting forwardly and rearwardly, and to these are secured cables 25 which after passing around pulleys 26 mounted upon one of the sills of the frame 1 are extended rearwardly and connected respectively to the lower ends of intermediately pivoted foot pedals 27 mounted in the floor of the vehicle.

The manual clutch controlling means just described is supplemented by an automatic controlling mechanism comprising arms 28, respectively mounted upon the rock-shafts 23 beneath the casing 5, and a trip-arm 29 upon the steering bar 4 between the arms 28, said trip-arm being engageable with the downwardly turned front ends of said arms 28 just before the steering bar reaches the respective limits of its movement, so as to rock the shaft 23 and throw out the clutch member 15 through which the wheels are being turned.

Owing to the use of the two worm and worm-wheel gearings, the speed at which the arm 20 is rocked and at which the steering wheels are turned will be very much reduced as compared to that at which the engine shaft turns. It will be evident that the shaft 14 is adapted to be driven in either direction according to which of the clutches 15 is thrown in, and that accordingly the direction in which the steering wheels are turned also depends upon which of the two clutch connections is established. The extent to which the wheels are turned in either direction must depend upon the duration of pressure upon the corresponding foot-pedal, but if such pressure is not released when the wheels have been turned through substantially the maximum permissible angle damage to any of the parts is prevented by automatically disengaging the driving clutch member through tripping of the corresponding arm 28 by the arm 29.

The employment of foot-pedals to control the steering mechanism is advantageous in that the hands of the operator are free for manipulation of control levers and switches, and such a control means furthermore is especially suitable for the use of persons who through the loss of one or both arms would find manipulation of a steering wheel either difficult or impossible. It is obvious, however, that a hand controlling device or devices could be readily substituted for the foot-pedals if desired.

What I claim is:

1. In a power steering mechanism, the combination with the engine, steering wheels and steering bar, of a rock arm having its axis of rotation parallel to that of the engine shaft, means for actuating the steering bar from said rock-arm, mechanism for actuating said rock-arm in either direction from the engine including clutches controlling the direction of movement, and means for independently controlling said clutches from the driver's seat of the vehicle.

2. In a power steering mechanism, the combination with the engine, steering wheels and steering bar, of a vertical shaft, gearing for driving the same from the engine, a bevel gear fast upon said shaft, a horizontal shaft, a pair of bevel gears loose on the horizontal shaft and enmeshed with the first mentioned bevel gear at diametrically opposed points, a rock arm having its pivotal axis parallel to that of the engine shaft, a gearing for actuating said rock-arm from the horizontal shaft, a swinging connection between said arm and the steering bar, clutch members engageable respectively with said loosely mounted bevel gears, and means for independently actuating said clutch members from the driver's seat.

3. In a power steering mechanism, the combination with the engine and steering wheels, of a shaft actuable by the engine in either direction of rotation, a pair of clutches controlling the direction of rotation of said shaft, a mechanism actuating the steering wheels angularly from said shaft according to the direction of rotation of the shaft, rock-shafts respectively associated with said clutches, means carried by said shafts for shifting the clutches, mechanism engaging the upper ends of said shafts actuable from the driver's seat to rock the same, and means engaging the lower extremities of the shafts to automatically rock the same and release the clutches as the wheels approach their limiting positions of angular movement.

In testimony whereof I sign this specification.

WALTER L. SHELDON.